United States Patent
Russo et al.

(10) Patent No.: US 11,010,589 B1
(45) Date of Patent: May 18, 2021

(54) DEFENSIVE MEASURES FOR RESIDUE RE-IMAGING

(71) Applicant: Synaptics Incorporated, San Jose, CA (US)

(72) Inventors: Anthony P. Russo, New York, NY (US); Erik Jonathon Thompson, San Jose, CA (US)

(73) Assignee: SYNAPTICS INCORPORATED, San Jose, CA (US)

(*) Notice: Subject to any disclaimer, the term of this patent is extended or adjusted under 35 U.S.C. 154(b) by 0 days.

(21) Appl. No.: 16/357,306

(22) Filed: Mar. 18, 2019

Related U.S. Application Data

(60) Provisional application No. 62/644,363, filed on Mar. 16, 2018.

(51) Int. Cl.
*G06K 9/00* (2006.01)

(52) U.S. Cl.
CPC ....... *G06K 9/00087* (2013.01); *G06K 9/0002* (2013.01); *G06K 9/00288* (2013.01); *G06K 9/00899* (2013.01)

(58) Field of Classification Search
CPC ........... G06K 9/00093; G06K 9/00288; G06K 9/00087; G06K 9/0002; G06K 9/00899; H04W 12/06; G06F 21/81; G06F 21/83
USPC .................................................. 382/115, 124
See application file for complete search history.

(56) References Cited

U.S. PATENT DOCUMENTS

| | | |
|---|---|---|
| 6,535,622 B1 | 3/2003 | Russo et al. |
| 2002/0050713 A1 | 5/2002 | Bergenek et al. |
| 2003/0202687 A1 | 10/2003 | Hamid et al. |
| 2004/0026635 A1 | 2/2004 | Lee et al. |
| 2004/0096086 A1* | 5/2004 | Miyasaka ............... G06F 21/83 382/124 |
| 2004/0252869 A1 | 12/2004 | Kondo et al. |
| 2007/0047771 A1* | 3/2007 | Watanabe .......... G06K 9/00288 382/115 |
| 2012/0195475 A1* | 8/2012 | Abiko ................ G06K 9/00093 382/115 |
| 2016/0070967 A1 | 3/2016 | Du et al. |
| 2017/0032114 A1* | 2/2017 | Turgeman ............. H04W 12/06 |
| 2017/0220842 A1 | 8/2017 | Thompson et al. |
| 2018/0005394 A1* | 1/2018 | Russo ................ G06K 9/00026 |
| 2019/0251329 A1* | 8/2019 | Jiang ....................... G06F 21/81 |

FOREIGN PATENT DOCUMENTS

WO   WO 00/51084   8/2000

\* cited by examiner

*Primary Examiner* — Abdul-Samad A Adediran
(74) *Attorney, Agent, or Firm* — Paradice & Li LLP

(57) ABSTRACT

An input device includes a biometric sensor and a processing system. The biometric sensor is configured to capture images of a sensing region of the input device. The processing system is configured to acquire a first image of the sensing region in response to a first authentication trigger, and to acquire a second image of the sensing region in response to a second authentication trigger. The processing system is further configured to determine an amount of similarity between the first image and the second image, and to validate the second image for user authentication when the amount of similarity between the first image and the second image is below a threshold level.

20 Claims, 6 Drawing Sheets

DEFENSIVE MEASURES FOR RESIDUE RE-IMAGING

CROSS-REFERENCE TO RELATED APPLICATION

This application claims the benefit of and commonly owned U.S. Provisional Patent Application No. 62/644,363 entitled "DEFENSIVE MEASURES FOR RESIDUE RE-IMAGING" filed on Mar. 16, 2018, the entirety of which is hereby incorporated by reference.

TECHNICAL FIELD

The present embodiments relate generally to fingerprint detection, and specifically to preventing residue re-imaging during fingerprint detection.

BACKGROUND OF RELATED ART

Authentication is a mechanism for verifying the identity of a user (e.g., an individual or entity) attempting to access a device and/or application. A basic form of authentication may require a user to input a username and password via an input device. However, usernames and passwords are easily stolen and can be used by anyone (e.g., not just the authorized user) to gain access to a corresponding device or application. Thus, modern authentication schemes increasingly rely on biometric sensors (e.g., sensors capable of identifying unique biological characteristics of the user) to provide greater levels of security. Example biometric sensors include: fingerprint scanners, facial recognition systems, eye scanners, voice recognition systems, and the like. Biometric inputs typically require the user to physically interact with one or more sensors to perform authentication.

Although more secure, biometric authentication schemes are not without their limitations. For example, fingerprint scanners typically require a user to press his/her finger onto an input surface (such as a display screen) for proper detection. However, the user may often leave a "residual" fingerprint on the input surface (e.g., from oil, sweat, or other residue) at the point of contact with the user's finger. Some fingerprint scanners may be spoofed by the residual fingerprint left on the input surface (e.g., in lieu of the actual user's finger). Thus, when performing fingerprint scanning, it may be desirable to distinguish residual fingerprints from the actual finger being scanned (e.g., to prevent fingerprint scanners or similar biometric authentication devices from granting access to unauthorized users).

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

An apparatus and method for validating a verification image (e.g., a scanned fingerprint) is disclosed. In some aspects, the apparatus may include an input device that, in turn, includes a processing system and a biometric sensor. The biometric sensor is configured to capture images of a sensing region of the input device. The processing system is configured to acquire a first image of the sensing region in response to a first authentication trigger, and to acquire a second image of the sensing region in response to a second authentication trigger. The processing system is further configured to determine an amount of similarity between the first image and the second image, and then validate the second image for user authentication when the amount of similarity between the first image and the second image is below a threshold level.

In some aspects, the processing system may be further configured to acquire a third image of the sensing region, wherein the third image is acquired subsequent to the first image and prior to the second image. The processing system may then determine an amount of similarity between the third image and the second image. Further, the processing system may validate the second image by determining that the amount of similarity between the third image and the second image is below the threshold level.

A method for validating a verification image (e.g., a scanned fingerprint) is disclosed. In some aspects, the method may include acquiring a first image of a sensing region in response to a first authentication trigger, and acquiring a second image of the sensing region in response to a second authentication trigger. The method may further include determining an amount of similarity between the first image and the second image, and validating the second image for user authentication when the amount of similarity between the first image and the second image is below a threshold level.

A system for validating a verification image (e.g., a scanned fingerprint) is disclosed. In some aspects, the system may include a biometric sensor configured to capture images of a sensing region, one or more processors, and a non-transitory computer-readable medium. The non-transitory computer-readable medium may store instructions that, when executed by the one or more processors, cause the system to acquire a first image of the sensing region in response to a first authentication trigger and acquire a second image of the sensing region in response to a second authentication trigger. Execution of the instructions may further cause the system to determine an amount of similarity between the first image and the second image, and validate the second image for user authentication when the amount of similarity between the first image and the second image is below a threshold level.

BRIEF DESCRIPTION OF THE DRAWINGS

The present embodiments are illustrated by way of example and are not intended to be limited by the figures of the accompanying drawings.

DETAILED DESCRIPTION

Figure 1:
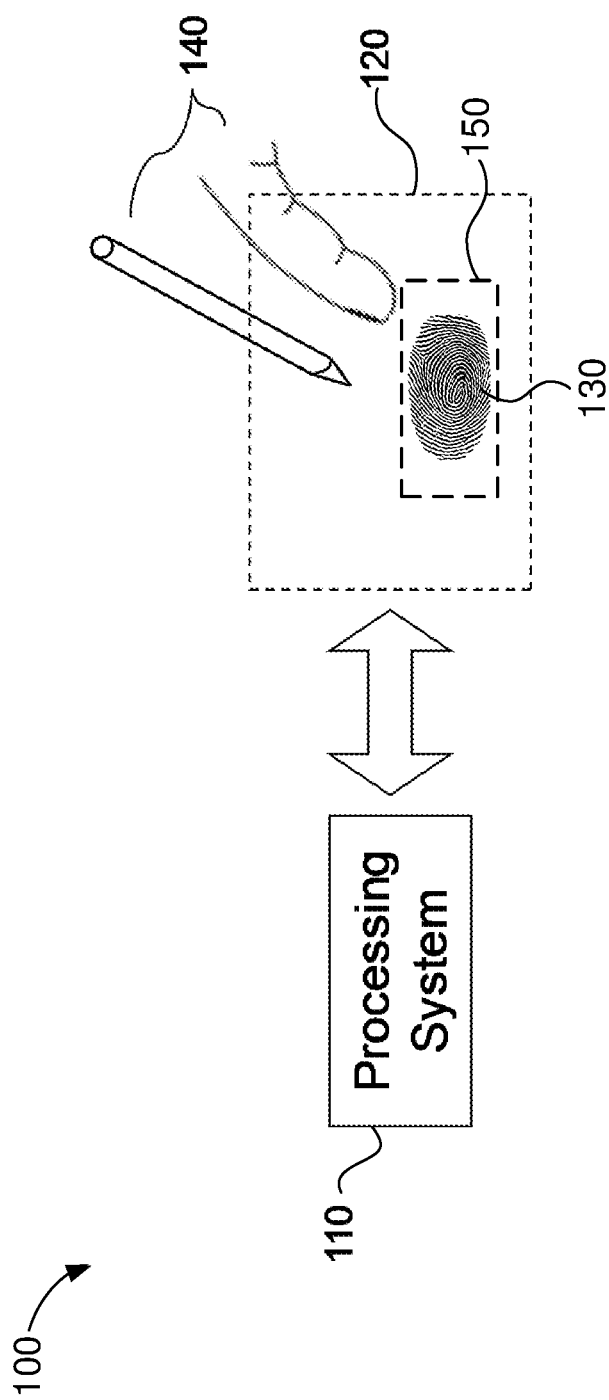
FIG. 1 shows an example input device within which the present embodiments may be implemented.

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors. The term "processor," as used herein may refer to any general purpose processor, conventional processor, controller, microcontroller, and/or state machine capable of executing scripts or instructions of one or more software programs stored in memory. The term "voltage source," as used herein may refer to a direct-current (DC) voltage source, an alternating-current (AC) voltage source, or any other means of creating an electrical potential (such as ground).

FIG. 1 shows an example input device 100 within which the present embodiments may be implemented. The input device 100 includes a processing system 110 and a sensing region 120. The input device 100 may be configured to provide input to an electronic system (not shown for simplicity). Examples of electronic systems may include personal computing devices (e.g., desktop computers, laptop computers, netbook computers, tablets, web browsers, e-book readers, and personal digital assistants (PDAs)), composite input devices (e.g., physical keyboards, joysticks, and key switches), data input devices (e.g., remote controls and mice), data output devices (e.g., display screens and printers), remote terminals, kiosks, video game machines (e.g., video game consoles, portable gaming devices, and the like), communication devices (e.g., cellular phones such as smart phones), and media devices (e.g., recorders, editors, and players such as televisions, set-top boxes, music players, digital photo frames, and digital cameras).

In some aspects, the input device 100 may be implemented as a physical part of the corresponding electronic system. Alternatively, the input device 100 may be physically separated from the electronic system. The input device 100 may be coupled to (and communicate with) components of the electronic system using various wired and/or wireless interconnection and communication technologies, such as buses and networks. Examples technologies may include Inter-Integrated Circuit (I²C), Serial Peripheral Interface (SPI), PS/2, Universal Serial bus (USB), Bluetooth®, Infrared Data Association (IrDA), and various radio frequency (RF) communication protocols defined by the IEEE 802.11 standard.

In the example of FIG. 1, the input device 100 may correspond to a proximity sensor device (e.g., also referred to as a "touchpad" or "touch sensor device") configured to sense input provided by one or more input objects 140 in the sensing region 120. Example input objects 140 include fingers, styli, and the like. The sensing region 120 may encompass any space above, around, in, and/or proximate to the input device 100 in which the input device 100 is able to detect user input (such as provided by one or more input objects 140). The size, shape, and/or location of the sensing region 120 (e.g., relative to the electronic system) may vary depending on actual implementations.

In some embodiments, the sensing region 120 may extend from a surface of the input device 100 in one or more directions in space, for example, until a signal-to-noise ratio (SNR) of the sensors falls below a threshold suitable for object detection. For example, the distance to which the sensing region 120 extends in a particular direction may be on the order of less than a millimeter, millimeters, centimeters, or more, and may vary with the type of sensing technology used and/or accuracy desired. In some embodiments, the sensing region 120 may detect inputs involving no physical contact with any surfaces of the input device 100, contact with an input surface (e.g., a touch surface and/or screen) of the input device 100, contact with an input surface of the input device 100 coupled with some amount of applied force or pressure, and/or any combination thereof.

In some embodiments, input surfaces may be provided by, and/or projected on, one or more surfaces of a housing of the input device 100 (e.g., as an image). For example, the sensing region 120 may have a rectangular shape when projected onto an input surface of the input device 100. In some aspects, inputs may be provided through images spanning one, two, three, or higher dimensional spaces in the sensing region 120. In some other aspects, inputs may be provided through projections along particular axes or planes in the sensing region 120. Still further, in some aspects, inputs may be provided through a combination of images and projections in the sensing region 120.

The input device 100 may utilize various sensing technologies to detect user input. Example sensing technologies may include capacitive, elastic, resistive, inductive, magnetic, acoustic, ultrasonic, thermal, and optical sensing technologies. In some embodiments, the input device 100 may utilize capacitive sensing technologies to detect user inputs. For example, the sensing region 120 may include one or more capacitive sensing elements (e.g., sensor electrodes) to create an electric field. The input device 100 may detect inputs based on changes in capacitance of the sensor electrodes. For example, an object in contact with (or close proximity to) the electric field may cause changes in the voltage and/or current in the sensor electrodes. Such changes in voltage and/or current may be detected as "signals" indicative of user input. The sensor electrodes may be arranged in arrays or other configurations to detect inputs at multiple points within the sensing region 120. In some aspects, some sensor electrodes may be ohmically shorted together to form larger sensor electrodes. Some capacitive sensing technologies may utilize resistive sheets that provide a uniform layer of resistance.

Example capacitive sensing technologies may be based on "self-capacitance" (also referred to as "absolute capacitance") and/or "mutual capacitance" (also referred to as "transcapacitance"). Absolute capacitance sensing methods detect changes in the capacitive coupling between sensor electrodes and an input object. For example, an input object near the sensor electrodes may alter the electric field near the sensor electrodes, thus changing the measured capacitive coupling. In some embodiments, the input device 100 may implement absolute capacitance sensing by modulating sensor electrodes with respect to a reference voltage and detecting the capacitive coupling between the sensor electrodes and input objects. The reference voltage may be substantially constant or may vary. In some aspects, the reference voltage may correspond to a ground potential.

Transcapacitance sensing methods detect changes in the capacitive coupling between sensor electrodes. For example, an input object near the sensor electrodes may alter the electric field between the sensor electrodes, thus changing the measured capacitive coupling of the sensor electrodes. In some embodiments, the input device 100 may implement transcapacitance sensing by detecting the capacitive coupling between one or more "transmitter" sensor electrodes and one or more "receiver" sensor electrodes. Transmitter sensor electrodes may be modulated relative to the receiver sensor electrodes. For example, the transmitter sensor electrodes may be modulated relative to a reference voltage to transmit signals, while the receiver sensor electrodes may be held at a relatively constant voltage to "receive" the transmitted signals. The signals received by the receiver sensor electrodes may be affected by environmental interference (e.g., from other electromagnetic signals and/or objects in contact with, or in close proximity to, the sensor electrodes). In some aspects, each sensor electrode may either be a dedicated transmitter or a dedicated receiver. In other aspects, each sensor electrode may be configured to transmit and receive.

The processing system 110 may be configured to operate the hardware of the input device 100 to detect input in the sensing region 120. In some embodiments, the processing system 110 may control one or more sensor electrodes to detect objects in the sensing region 120. For example, the processing system 110 may be configured to transmit signals via one or more transmitter sensor electrodes and receive signals via one or more receiver sensor electrodes. In some aspects, one or more components of the processing system 110 may be co-located, for example, in close proximity to the sensing elements of the input device 100. In other aspects, one or more components of the processing system 110 may be physically separated from the sensing elements of the input device 100. For example, the input device 100 may be a peripheral coupled to a computing device, and the processing system 110 may be implemented as software executed by a central processing unit (CPU) of the computing device. In another example, the input device 100 may be physically integrated in a mobile device, and the processing system 110 may correspond, at least in part, to a CPU of the mobile device.

In some embodiments, the processing system 110 may be implemented as a set of modules that are implemented in firmware, software, or a combination thereof. Example modules include hardware operation modules for operating hardware such as sensor electrodes and display screens; data processing modules for processing data such as sensor signals and positional information; and reporting modules for reporting information. In some embodiments, the processing system 110 may include sensor operation modules configured to operate sensing elements to detect user input in the sensing region 120; identification modules configured to identify gestures such as mode changing gestures; and mode changing modules for changing operation modes of the input device 100 and/or electronic system.

The input device 100 may include additional input components that can be operated by the processing system 110 or another processing system. In some embodiments, the additional input components may include one or more biometric sensors (not shown for simplicity) that may be used to authenticate a user of the input device 100 and/or the corresponding electronic system. For example, a fingerprint scanner may use capacitive and/or optical fingerprint imaging technologies to detect and analyze a user's fingerprint in a fingerprint scanning region 150. In some aspects, the fingerprint scanning region 150 may coincide with, or substantially overlap, the sensing region 120.

The processing system 110 may respond to user input in the sensing region 120 and/or fingerprint scanning region 150 by triggering one or more actions. Example actions include changing an operation mode of the input device 100 and/or graphical user interface (GUI) actions such as cursor movement, selection, menu navigation, and the like. In some embodiments, the processing system 110 may determine positional information for a detected input. The term "positional information," as used herein, refers to any information describing or otherwise indicating a position or location of the detected input (e.g., within the sensing region 120). Example positional information may include absolute position, relative position, velocity, acceleration, and/or other types of spatial information. In some embodiments, the processing system 110 may provide information about the detected input to the electronic system (e.g., to a CPU of the electronic system). The electronic system may then process information received from the processing system 110 to carry out additional actions (e.g., changing a mode of the electronic system and/or GUI actions).

The processing system 110 may operate the sensing elements of the input device 100 to produce electrical signals indicative of input (or lack of input) in the sensing region 120 and/or fingerprint scanning region 150. The processing system 110 may perform any appropriate amount of processing on the electrical signals to translate or generate the information provided to the electronic system. For example, the processing system 110 may digitize analog signals received via the sensor electrodes and/or perform filtering or conditioning on the received signals. In some aspects, the processing system 110 may subtract or otherwise account for a "baseline" associated with the sensor electrodes. For example, the baseline may represent a state of the sensor electrodes when no user input is detected. Accordingly, the information provided by the processing system 110 to the electronic system may reflect a difference between the signals received from the sensor electrodes and a baseline associated with each sensor electrode.

In some embodiments, the input device 100 may include a touch screen interface (e.g., display screen) that at least partially overlaps the sensing region 120. For example, the sensor electrodes of the input device 100 may form a substantially transparent overlay on the display screen, thereby providing a touch screen interface for the associated electronic system. The display screen may be any type of dynamic display capable of displaying a visual interface to a user. Examples of suitable display screen technologies may include light emitting diode (LED), organic LED (OLED), cathode ray tube (CRT), liquid crystal display (LCD), plasma, electroluminescence (EL), or other display technology.

In some embodiments, the input device 100 may share physical elements with the display screen. For example, one or more of the sensor electrodes may be used in displaying the interface and sensing inputs. More specifically, a sensor electrode used for sensing inputs may also operate as a display electrode used for displaying at least a portion of the interface. In some embodiments, the input device 100 may include a first sensor electrode configured for displaying at least part of the interface and sensing inputs, and a second sensor electrode may be configured for input sensing only. For example, the second sensor electrode may be disposed between substrates of the display device or may be external to the display device.

In some aspects, the display screen may be controlled or operated, at least in part, by the processing system 110. The processing system 110 may be configured to execute instructions related to sensing inputs and displaying the interface. For example, the processing system 110 may drive a display electrode to display at least a portion of the interface and sense user inputs, concurrently. In another example, the processing system 110 may drive a first display electrode to display at least a portion of the interface while concurrently driving a second display electrode to sense user inputs.

As described above, fingerprint scanners typically require a user to press his/her finger onto the input surface (e.g., the fingerprint scanning region 150) of the input device 100. The contact between the user's finger and the input surface may leave a residual fingerprint 130 in the fingerprint scanning region 150 (e.g., from oil, sweat, or other residue on the user's finger). If the residual fingerprint 130 includes sufficient details and/or information about the user's fingerprint, the fingerprint scanner may be spoofed into authenticating an unauthorized user of the input device 100.

Aspects of the present disclosure provide a method and apparatus for distinguishing residual fingerprints from an actual finger being scanned. In some embodiments, the processing system 110 may reject a verification image during a fingerprint scanning operation if the verification image is too similar (e.g., does not meet a threshold difference requirement) to a prior verification image acquired by the same fingerprint scanner. For example, aspects of the present disclosure recognize that the likelihood of a user's finger landing in the exact same position and orientation (e.g., within the fingerprint scanning region 150) during two or more fingerprint scanning operations is very low. Thus, in some aspects, the processing system 110 may look for movement (e.g., at least a threshold change in position and/or orientation) of the detected fingerprint between two or more verification images.

Aspects of the present disclosure also recognize that the state of the input surface may change between the times at which consecutive fingerprint scanning operations are performed. For example, environmental factors (e.g., evaporation, condensation, fading, smearing, etc.) may cause movements in the residual fingerprint 130 itself. As a result, the residual fingerprint 130 may appear to have "moved" slightly from the time a first verification image is captured to the time a second verification image is captured. It is also noted that a verified user is likely to leave additional fingerprints on the input surface when operating the input device 100 via touch inputs (e.g., after being successfully authenticated by a fingerprint scanning operation). As a result, the fingerprint scanning region 150 may have additional residual fingerprints, when the second verification image is captured, that were not present in the first verification image. Thus, in some embodiments, the processing system 110 may capture additional images of the fingerprint scanning region 150 (e.g., between successive scanning operations) to ensure that the fingerprint detected in a verification image is sufficiently different than any residual fingerprints that may have been present in the fingerprint scanning region 150 prior to authentication.

Among other advantages, the embodiments described herein may prevent fingerprint scanners from being spoofed by residual fingerprints left on the input surface of the input device (e.g., in the fingerprint scanning region 150). More specifically, by comparing the current verification image to a previous verification image, aspects of the present disclosure may ensure that any fingerprint(s) detected during the current fingerprint scanning operation were not leftover (e.g., as residual fingerprints) from a prior fingerprint scanning operation. Furthermore, by augmenting the previous verification image with updated images of the fingerprint scanning region 150, the example embodiments may ensure that any changes to the state of the input surface, prior to performing the current fingerprint scanning operation, are reflected in the comparison.

Figure 2:
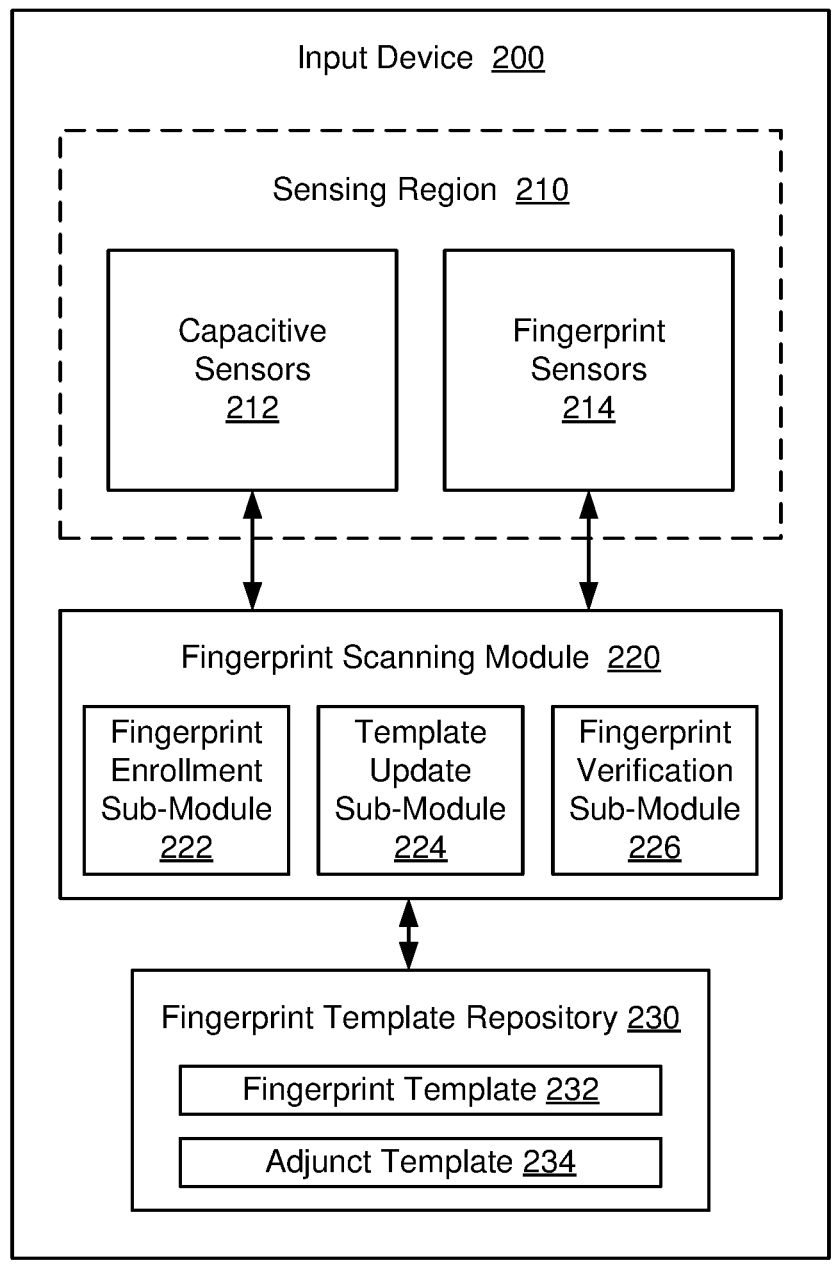
FIG. 2 shows a block diagram of an input device capable of distinguishing residual fingerprints, in accordance with some embodiments.

FIG. 2 shows a block diagram of an input device 200 capable of distinguishing residual fingerprints, in accordance with some embodiments. The input device 200 includes a sensing region 210, a fingerprint scanning module 220, and a fingerprint template repository 230. The sensing region 210 may encompass any space above, around, in, and/or proximate to the input device 200 in which the input device 200 is able to detect user input, such as provided by one or more input objects (not shown for simplicity). The size, shape, and/or location of the sensing region 210 may vary depending on actual implementations.

In some embodiments, the sensing region 210 includes, or is otherwise coupled to, a set of capacitive sensors 212 and fingerprint sensors 214. For example, the capacitive sensors 212 may include an array of sensor electrodes that create an electric field in and/or around the sensing region 210. The input device 200 may detect inputs based on changes in capacitance of the sensor electrodes and/or the electric field. The fingerprints sensors 214 may use capacitive and/or optical fingerprint imaging technologies to scan or image a user's finger in the sensing region 210. In some embodiments, the fingerprint sensors 214 may include an array of active pixel sensors (e.g., photodiodes, CMOS image sensor arrays, CCD arrays, and/or any other sensors capable of detecting wavelengths of light in the visible spectrum, the infrared spectrum, or the ultraviolet spectrum) that are used for capturing high resolution images, such as required for fingerprint scanning. It is noted that, while specific embodiments may be described with respect to optical fingerprint sensors, aspects of the present disclosure may be readily implemented in capacitive fingerprint sensors, ultrasonic fingerprint sensors, thermal fingerprint sensors, or the like, with little or no modification.

The capacitive sensors 212 and fingerprint sensors 214 are coupled to the fingerprint scanning module 220. The fingerprint scanning module 220 may be implemented by, or include at least a portion of, a processing system (such as processing system 110) that controls an operation of the fingerprint sensors 214 and/or capacitive sensors 212. The fingerprint scanning module 220 may operate the fingerprint sensors 214 to scan (e.g., capture an image of) a user's fingerprint and authenticate the user based on the fingerprint scan. In some embodiments, the fingerprint scanning module 220 may prevent residual fingerprints in the sensing region 210 from interfering with the fingerprint scanning operation. For example, the fingerprint scanning module 220 may prevent the residual fingerprints from being re-imaged and used to validate an unauthorized user. More specifically, when performing a fingerprint scanning operation, the fingerprint scanning module 220 may ensure that the scanned fingerprint being analyzed for authentication purposes is from a finger physically in contact with the sensing region 210 (e.g., an authenticated fingerprint) and not a residual fingerprint left over from a previous fingerprint scan and/or user contact with the sensing region 210.

In some embodiments, the fingerprint scanning module 220 may include a fingerprint enrollment sub-module 222, a template update sub-module 224, and a fingerprint verification sub-module 226. The fingerprint enrollment sub-module 222 may enroll one or more fingerprints of an authorized user (e.g., during an initial set-up or enrollment process) to be used for subsequent fingerprint authentication. For example, the fingerprint enrollment sub-module 222 may capture one or more images of the user's finger, in various positions and/or orientations, while pressed against an input surface (e.g., coinciding with the sensing region 210) of the input device 200. In some embodiments, the fingerprint enrollment sub-module 222 may analyze identifying features of the user's fingerprints from the captured images, and may generate a fingerprint template 232 for the user (e.g., which may include the captured images) based on the analysis. For example, the identifying features may include a pattern of ridges on the surface of the user's finger. The fingerprint template 232 may be stored in the fingerprint template repository 230.

The template update sub-module 224 may acquire updated information from the fingerprint sensors 214 to supplement the information stored in the fingerprint template repository 230. More specifically, the template update sub-module 224 may record the presence of any residual fingerprints on the input surface which may interfere with a subsequent fingerprint authentication operation. In some embodiments, the template update sub-module 224 may acquire the updated information from a verification image captured by the fingerprint sensors 214 during a fingerprint authentication operation. For example, the verification image may correspond to an image of the sensing region 210 (or at least a portion thereof) including the input object (e.g., user's finger) that triggered the authentication operation. In some aspects, the template update sub-module 224 may analyze a position and/or orientation of one or more fingerprints detected in the verification image, and may generate an adjunct template 234 (e.g., which may include the verification image) based on the analysis. The adjunct template 234 may be stored in the fingerprint template repository 230.

In some embodiments, the template update sub-module 224 may further update the adjunct template 234 to reflect any changes to the state of the sensing region 210 and/or input surface since the last verification image was acquired. For example, the template update sub-module 224 may attempt to capture any and all residual fingerprints that may have accumulated on the input surface prior to a subsequent fingerprint authentication operation, but are not reflected in the previous verification image. Thus, the template update sub-module 224 may operate the fingerprint sensors 214 to capture update images of the sensing region 210 (or at least a portion thereof) independent of any fingerprint enrollment or authentication operation. In some embodiments, the template update sub-module 224 may analyze a position and/or orientation of one or more fingerprints detected in the update images, and may update the adjunct template 234 (e.g., which may include the update images) based on the analysis. In some aspects, the template update sub-module 224 may store each update image in the adjunct template 234. In other aspects, the template update sub-module 224 may store only the most recent update image in the adjunct template 234 (e.g., replacing any previously-stored images).

In some embodiments, the template update sub-module 224 may acquire the update images periodically (e.g., every 5 minutes) and/or at predetermined times. In some other embodiments, the template update-sub-module 224 may acquire the update images when a transition event has occurred. For example, a transition event may indicate that the electronic system has not been used or operated by the authorized user for some time and/or is likely to require fingerprint authentication upon subsequent use. Example transition events may include, but are not limited to: powering down the display and/or locking the electronic system; the electronic system remaining idle and/or still for a threshold amount of time; detecting a user's finger in contact with or proximate to (e.g., hovering over) the sensing region 210; detecting a change in position and/or orientation of the electronic system via an accelerometer; detecting a change in light from an ambient light sensor; and detecting that a button has been depressed.

The fingerprint verification sub-module 226 may analyze a verification image captured during a fingerprint authentication operation to determine whether the verification image includes a valid fingerprint belonging to an authorized user of the input device 200. In some aspects, the fingerprint verification sub-module 226 may trigger the fingerprint sensors 214 to capture the verification image when an authentication event is triggered (e.g., when a finger or input object makes contact with a portion of the sensing region 210 coinciding with the fingerprint sensors 214). In some embodiments, the fingerprint verification sub-module 226 may use the information stored in the fingerprint repository 230 to determine whether to authenticate the user associated with the verification image.

For example, the fingerprint verification sub-module 226 may compare the verification image to the fingerprint template 232 to determine whether the verification image includes a verified fingerprint. In some aspects, the fingerprint verification sub-module 226 may detect the presence of a verified fingerprint if the fingerprint information and/or enrollment images included with the fingerprint template 232 matches fingerprint information from the verification image (e.g., regardless of position or orientation). In some implementations, the fingerprint verification sub-module 226 may use existing or known fingerprint matching techniques to determine a measure of similarity between the verification image and the fingerprint template 232. If a verified fingerprint cannot be detected from the verification image (e.g., the similarity measure is below a threshold level), the fingerprint verification sub-module 226 may prevent the user from accessing or operating the corresponding electronic system.

As described above, residual fingerprints left over by an authorized user may spoof some fingerprint scanners into authenticating an unauthorized user. Thus, in some embodiments, the fingerprint verification sub-module 226 may perform additional analysis on the verification image after a verified fingerprint has been detected. For example, the fingerprint verification sub-module 226 may further compare the verification image to the adjunct template 234 to determine whether the verified fingerprint is attributed to physical presentation of an actual user's finger or a residual fingerprint. In some aspects, the fingerprint verification sub-module 226 may determine whether the verified fingerprint is substantially different than any fingerprint information in the adjunct template 234. For example, it is noted that the likelihood of a user's finger landing multiple times (e.g., in the sensing region 210) in the same position and orientation is very low. Thus, the fingerprint verification sub-module 226 may detect movement of the verified fingerprint when comparing the verification image to the adjunct template 234.

In some implementations, the fingerprint verification sub-module 226 may use existing or known fingerprint matching techniques to determine a measure of similarity between the verification image and the adjunct template 234. In some embodiments, the fingerprint verification sub-module 226 may compare the verification image to each image included with the adjunct template 234 (e.g., including the previous verification image and each update image acquired since) and/or fingerprint information associated therewith. Notably, various environmental factors (e.g., evaporation, condensation, fading, smearing, etc.) may cause slight changes or apparent movement in one or more residual fingerprints on the input surface. Thus, changes and/or movements of the residual fingerprints may be tracked over time, and/or changes and/or movements of the residual fingerprints may be tracked algorithmically and certain changes and/or movements may be rejected. In some embodiments, the changes and/or movements may be compared to a threshold.

For example, while a residual fingerprint from a later image may appear substantially similar to the verified fingerprint, the same residual fingerprint from an earlier image may appear substantially different than the verified fingerprint. Thus, when compared to the later image, the verified fingerprint may be classified as a residual fingerprint. However, when compared to the earlier image, the verified fingerprint may be classified as an authenticated fingerprint (e.g., since the verified fingerprint appears to have moved). Thus, in some embodiments, the fingerprint verification sub-module 226 may authenticate the user if and only if the verified fingerprint is substantially different than each of the images included in the adjunct template 234 (e.g., the similarity measure is below a threshold level). If at least one of the images in the adjunct template shares a threshold amount of similarity with the verified fingerprint, the fingerprint verification sub-module 226 may prevent the user from accessing or operating the corresponding electronic system.

In some other embodiments, the fingerprint verification sub-module 226 may compare the verification image to only the most recently-acquired image in the adjunct template 234 (e.g., which may also be the only image included in the adjunct template 234) and/or fingerprint information associated therewith. For example, it may be assumed that any residual fingerprints detected in earlier images will still be present in later images or are no longer relevant (e.g., no longer resemble the verified fingerprint). Thus, the fingerprint verification sub-module 226 may authenticate the user if the verified fingerprint is substantially different than the most recent image included in the adjunct template 234 (e.g., the similarity measure is below a threshold level). If the most recent image shares a threshold amount of similarity with the verified fingerprint, the fingerprint verification sub-module 226 may prevent the user from accessing or operating the corresponding electronic system. In other embodiments, the fingerprint verification sub-module 226 may compare the verification image to images captured during a period of time in the adjunct template 234, or to a number of n images in the adjunct template 234.

Figure 3:
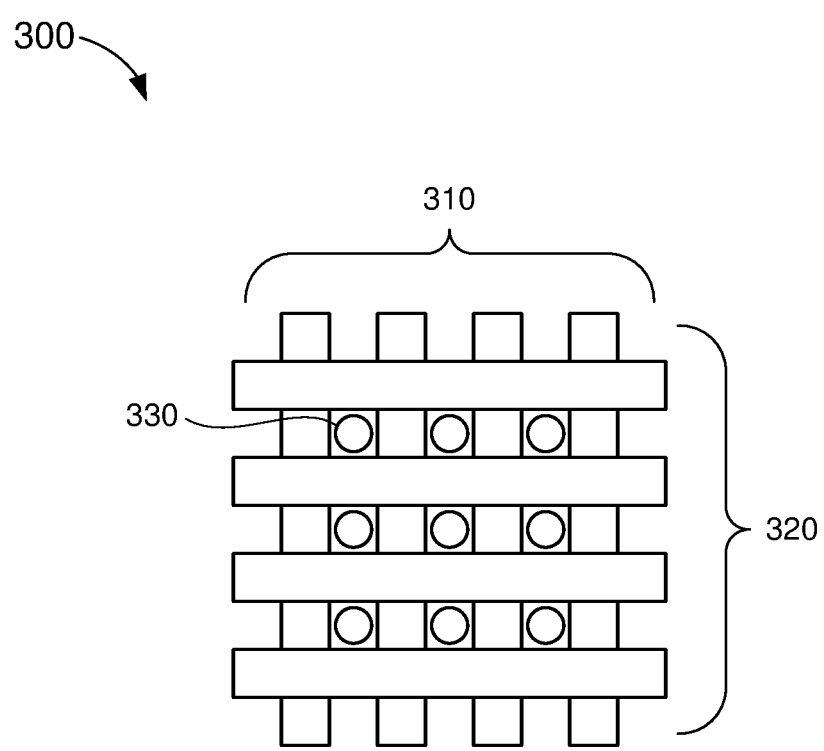
FIG. 3 shows an example sensor that may provide at least part of the sensing region of an input device, in accordance with some embodiments.

FIG. 3 shows an example sensor 300 that may provide at least part of the sensing region of an input device, in accordance with some embodiments. The sensor 300 includes a capacitive sensor array formed by a number of sensor electrodes 310 arranged in a vertical pattern and a number of sensor electrodes 320 arranged in a horizontal pattern. The sensor 300 further includes a number of optical sensing elements 330 provided between the sensor electrodes 310 and 320. In some embodiments, the sensor 300 may represent at least a portion of the sensing region 210 of FIG. 2 and/or the fingerprint scanning region 150 of FIG. 1. Accordingly, the sensor electrodes 310 and 320 may correspond to one or more of the capacitive sensors 212 and the optical sensing elements 330 may correspond to one or more of the fingerprint sensors 214.

In the example of FIG. 3, sensor electrodes 310 are shown to extend in a first (e.g., vertical) direction and sensor electrodes 320 are shown to extend in a second (e.g., horizontal) direction. Although the sensor electrodes 310 and 320 are depicted in a perpendicular grid arrangement, in actual implementations the sensor electrodes 310 and 320 may be arranged in other patterns. For example, in other embodiments, the sensor electrodes 310 may be parallel or diagonal to the sensor electrodes 320. Furthermore, each of the sensor electrodes 310 and 320 is shown to have substantially the same shape and size. However, in actual implementations the sensor electrodes 310 and 320 may be of various shapes and/or sizes. As discussed above with respect to FIGS. 1 and 3, sensor electrodes 310 and 320 may be transparent. Further, with respect to FIG. 3, sensor electrodes 310 and 320 may cover or overlap optical sensing elements 330. In addition, the resolution of the sensor electrodes 310 and 320 may be different from the resolution of the optical sensing elements 330.

The sensor electrodes 310 and 320 may detect touch inputs in the sensing region using capacitive sensing techniques. For example, in some implementations, one or more of the sensor electrodes 310 and 320 may be driven with modulated signals to determine changes in the absolute capacitance of the sensor electrodes (e.g., absolute capacitive sensing). In other implementations, a first sensor electrode (e.g., of the sensor electrodes 310 or 320) may be driven with a transmitter signal and a resulting signal may be received on a second sensor electrode (e.g., of the sensor electrodes 310 or 320). Still further, in some implementations, the sensor electrodes 310 and 320 may be configured for a combination of transcapacitance and absolute capacitance sensing. Using capacitive sensing techniques, the sensor electrodes 310 and 320 may detect input objects that are in contact with and/or proximate to the input surface (e.g., such as a finger hovering above the input surface).

The optical sensing elements 330 may generate a high-resolution image of the sensing region (or at least a portion thereof). For example, the optical sensing elements 330 may be used in fingerprint scanning applications to capture images from which fine biometric details may be discerned (such as a pattern of ridges on the surface of a finger). Thus, the optical sensing elements 330 may detect objects in the sensing region with a higher resolution than the sensor electrodes 310 and 320. However, the optical sensing elements 330 may also consume more power than the sensor electrodes 310 and 320 and may be unable to detect objects that are not in contact with the input surface (e.g., as the SNR of the sensors tapers off significantly with the increase in distance from the input surface).

In some embodiments, an input device may leverage the proximity sensing capabilities of the sensor electrodes 310 and 320 to selectively activate the optical sensing elements 330. As described above, it may be desirable to scan the sensing region just before a fingerprint authentication operation is about to be performed (e.g., to capture any and all residual fingerprints that may have accumulated on the input surface since a previous fingerprint authentication operation). Aspects of the present disclosure recognize that a finger hovering over the input surface is a relatively reliable indicator that the finger is about to make contact with the input surface, and thus a fingerprint authentication operation may be performed. Thus, in some embodiments, the sensor electrodes 310 and 320 (or a processing system coupled thereto) may trigger the optical sensing elements 330 to scan the sensing region (e.g., capture an update image) when the sensor electrodes 310 and 320 detect an input object hovering over (e.g., a threshold proximity from) the input surface. It is noted that the update image should not include the presence of the input object. Thus, in some aspects, the sensor electrodes 310 and 320 (or processing system) may ensure that the update image is captured before the input object makes contact with the input surface.

In some embodiments, the sensor electrodes 310 and 320 (or processing system) may trigger a display of the input device to display a "landing target" for the user's finger. For example, the landing target may indicate a region of the input surface (e.g., the fingerprint scanning region 150) in which the user should place his/her finger to be scanned by the optical sensing elements 330. In some aspects, the landing target may be triggered by activating an always-on-display (AOD) feature of the input device. For example, the AOD feature may correspond to a low-power mode of the display. Accordingly, the display may consume significantly less power when displaying images in the AOD than when fully turned on.

Figure 4:
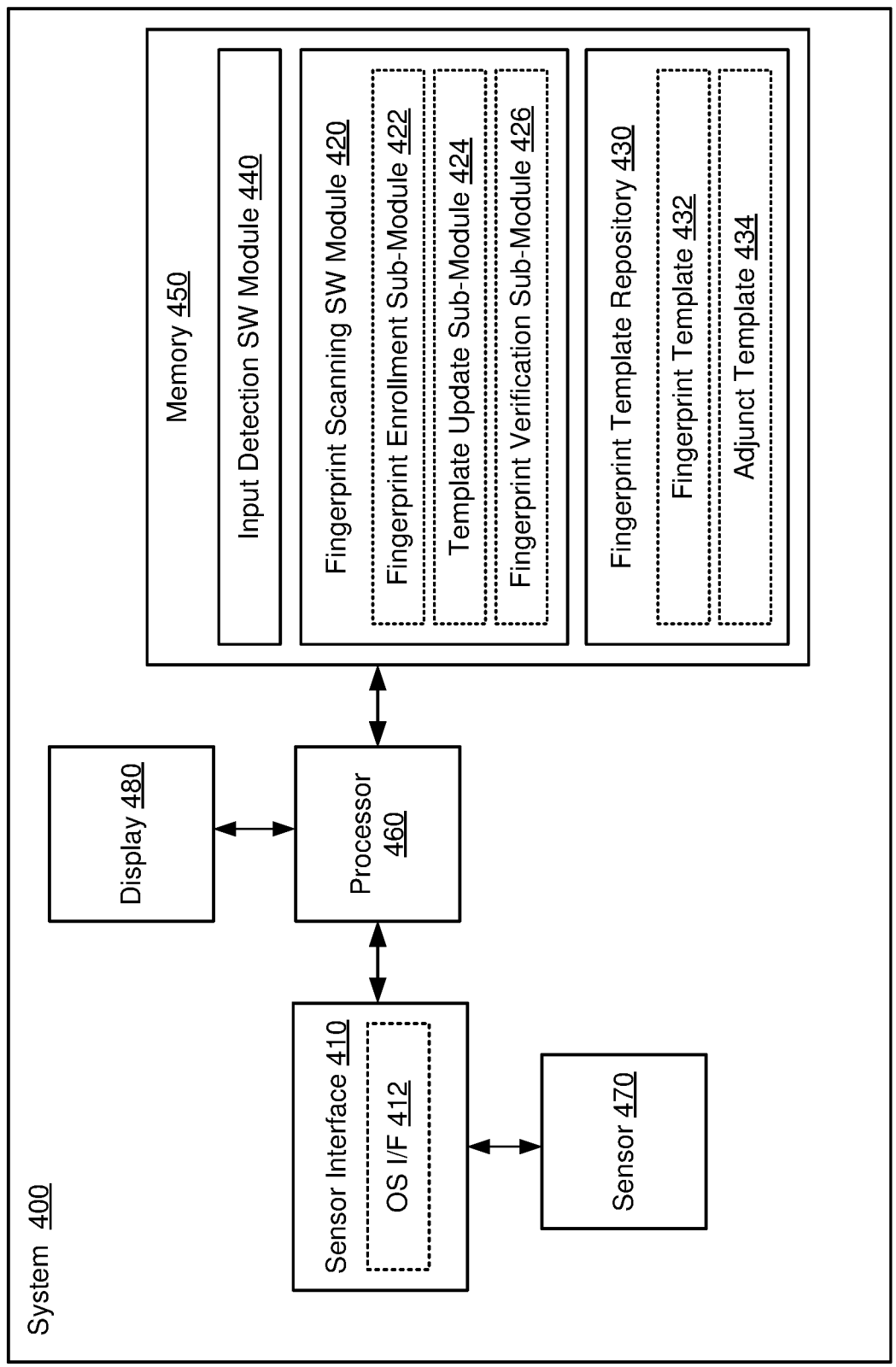
FIG. 4 is a block diagram of a system that may be used to validate a verification image of an input device, in accordance with some embodiments.

FIG. 4 is a block diagram of a system 400, in accordance with example embodiments. The system 400 may include all or part of the input device 100 of FIG. 1, the input device 200 of FIG. 2 and or the sensor 300 of FIG. 3. The processing system 400 may include a sensor interface 410, a processor 460, a memory 450, a sensor 470, and a display 480. For purposes of discussion herein, a processor 460 is shown in FIG. 4 as being coupled to the sensor interface 410, the memory 450, and the display 480. For actual embodiments, the sensor interface 410, processor 460, the memory 450, and/or the display 480 may be connected together using one or more buses (not shown for simplicity).

The sensor 470 may be coupled to the sensor interface 410. The sensor 470 may include capacitive and/or optical sensors to detect input objects including, for example, fingerprints. The sensor 470 may be an implementation of the sensor 300 of FIG. 3.

The sensor interface 410 may transmit and receive signals to and from the sensor 470. In one embodiment, the sensor interface 410 may include an optical sensor interface 412. The optical sensor interface may be used to communicate with one or more optical sensors included in the sensor 470. For example, the optical sensor interface 412 may transmit activation signals to, and receive optical sensor information from, the sensor 470 to capture an image of a sensing region associated with the sensor 470.

The display 480 may provide a visual interface to the user. In some embodiments, the display may include a display screen and one or more light producing devices. In some embodiments, the display 480 may be disposed near, or combined with, the sensor 470.

The memory 450 may include a fingerprint template repository 430 that may be used to store one or more fingerprint templates 432 and one or more adjunct templates 434. The fingerprint template repository 430, fingerprint template 432, and adjunct template 434 may be implementations of the fingerprint template repository 230, the fingerprint template 232, and the adjunct template 234 of FIG. 2.

Memory 450 may include a non-transitory computer-readable medium (e.g., one or more nonvolatile memory elements, such as EPROM, EEPROM, Flash memory, a hard drive, and so on) that may store at least the following software (SW) modules:

an input detection SW module 440 to detect inputs in the sensing region of an input device based at least in part on images acquired from the sensor 470 (e.g., optical sensing elements 330 in the sensor 300); and a fingerprint scanning SW module 420 to operate the sensor 470 to scan (e.g., capture an image of) a user's fingerprint, prevent residual fingerprints in the sensing region from interfering with the fingerprint scanning operation, and authenticate the user based on the fingerprint scan. The fingerprint scanning SW module 420 also may use data from the fingerprint template repository 430.

Each software module includes instructions that, when executed by processor 460, cause the system 400 to perform the corresponding functions. The non-transitory computer-readable medium of memory 450 thus includes instructions for performing all or a portion of the operations described below with respect to FIGS. 5 and 6.

Processor 460 may be any suitable one or more processors capable of executing scripts or instructions of one or more software programs stored in the system 400 (e.g., within memory 450). For example, processor 460 may execute the input detection SW module 440 to detect inputs in the sensing region of an input device based at least in part on captured images of the sensing region.

The processor 460 also may execute the fingerprint scanning SW module 420. In some embodiments, the fingerprint scanning SW module 420 may include a fingerprint enrollment sub-module 422, a template update sub-module 424, and a fingerprint verification sub-module 426. The processor 460 may execute the fingerprint enrollment sub-module 422 to enroll one or more fingerprints of an authorized user to be used for subsequent fingerprint authentication. In some embodiments, the processor 460 may execute the fingerprint enrollment sub-module 422 to analyze identifying features of the user's fingerprints from the captured images, and to generate the fingerprint template 432 for the user based on the analysis.

The processor 460 may execute the template update sub-module 424 to record the presence of any residual fingerprints on the input surface of the sensor 470 which may interfere with a subsequent fingerprint authentication operation. In some embodiments, the processor 460 may execute the template update sub-module 424 to analyze a position and/or orientation of one or more fingerprints detected in a verification image and generate the adjunct template 434.

The processor 460 may execute the fingerprint verification sub-module 426 to analyze a verification image captured during a fingerprint authentication operation to determine whether the verification image includes a valid fingerprint belonging to an authorized user of an input device. In some embodiments, the processor 460 may execute the fingerprint verification sub-module 426 to use the information stored in fingerprint template repository 430 to determine whether to authenticate the user associated with the verification image.

In some implementations, the fingerprint enrollment sub-module 422, the template update sub-module 424, and the fingerprint verification sub-module 426 may be embodiments of the fingerprint enrollment sub-module 222, the template update sub-module 224, and the fingerprint verification sub-module 226 of FIG. 2, respectively.

Figure 5:
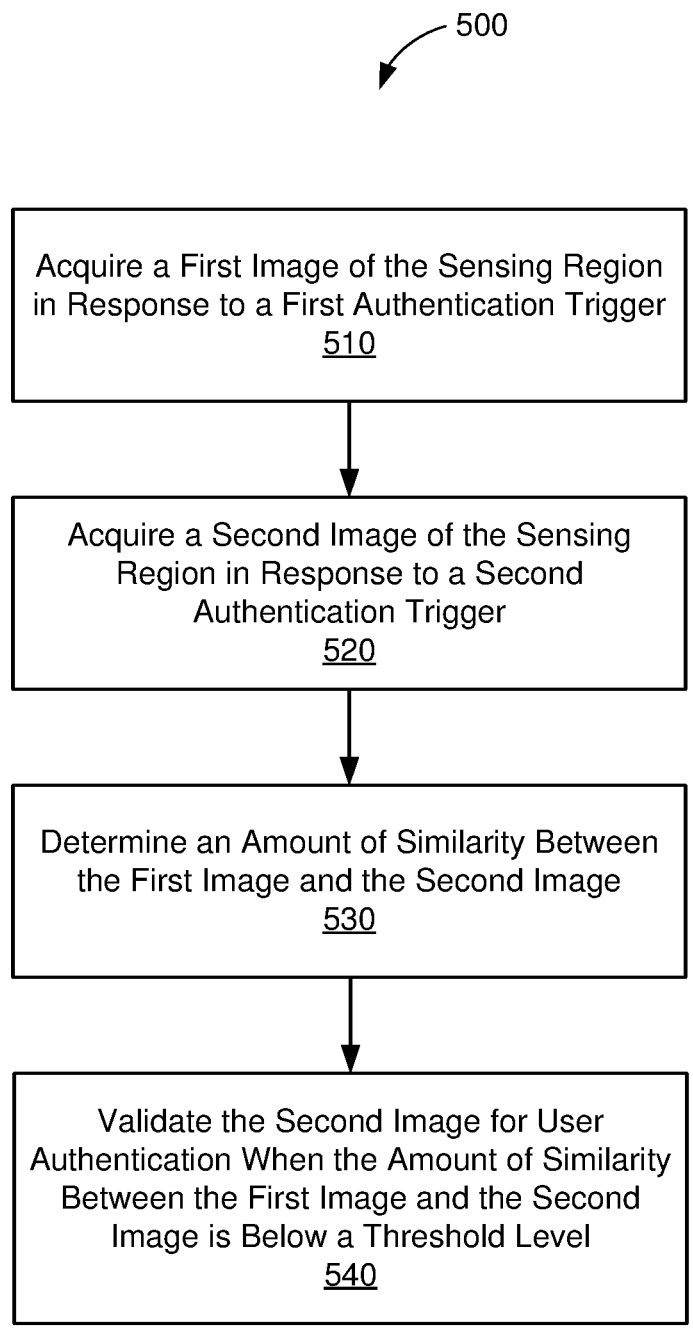
FIG. 5 is an illustrative flowchart depicting an example operation for validating a verification image, in accordance with some embodiments.

FIG. 5 is an illustrative flowchart depicting an example operation 500 for validating a verification image (e.g., a scanned fingerprint). In some implementations, the operation 500 may be performed by the fingerprint scanning module 220 of FIG. 2. In other implementations, the operation 500 may be performed by the fingerprint scanning SW module 420 of FIG. 4 or any other feasible module.

The fingerprint scanning module 220 may acquire a first image of a sensing region of an input device in response to a first authentication trigger (510). For example, the first image may correspond to a first verification image (e.g., a scanned fingerprint from a finger physically in contact with the sensing region). In some aspects, the first image may be stored in the adjunct template 234.

The fingerprint scanning module 220 may then acquire a second image of the sensing region of the input device in response to a second authentication trigger (520). For example, the second image may correspond to a second verification image (e.g., a scanned fingerprint from a finger physically in contact with the sensing region).

The fingerprint scanning module 220 may then determine an amount of similarity between the first image and the second image (530). For example, the fingerprint scanning module 220 may determine a measure of similarity between the first verification image stored in adjunct template 234 and the second verification image. In some embodiments, the amount of similarity is based at least in part on a change in position between the first verification image and the second verification image, a change in orientation between the first verification image and the second verification image, or a combination thereof.

The fingerprint scanning module 220 may then validate the second image for user authentication when the amount of similarity between the first image and the second image is below a threshold level (540). For example, if the first image corresponds to a scanned fingerprint from a finger that was physically in contact with the sensing region, and if the second image corresponds to another scanned fingerprint from a finger that was physically in contact with the sensing region, and if the amount of similarity between the two images is below the threshold level, fingerprint scanning module 220 may validate the second image for user authentication.

Figure 6:
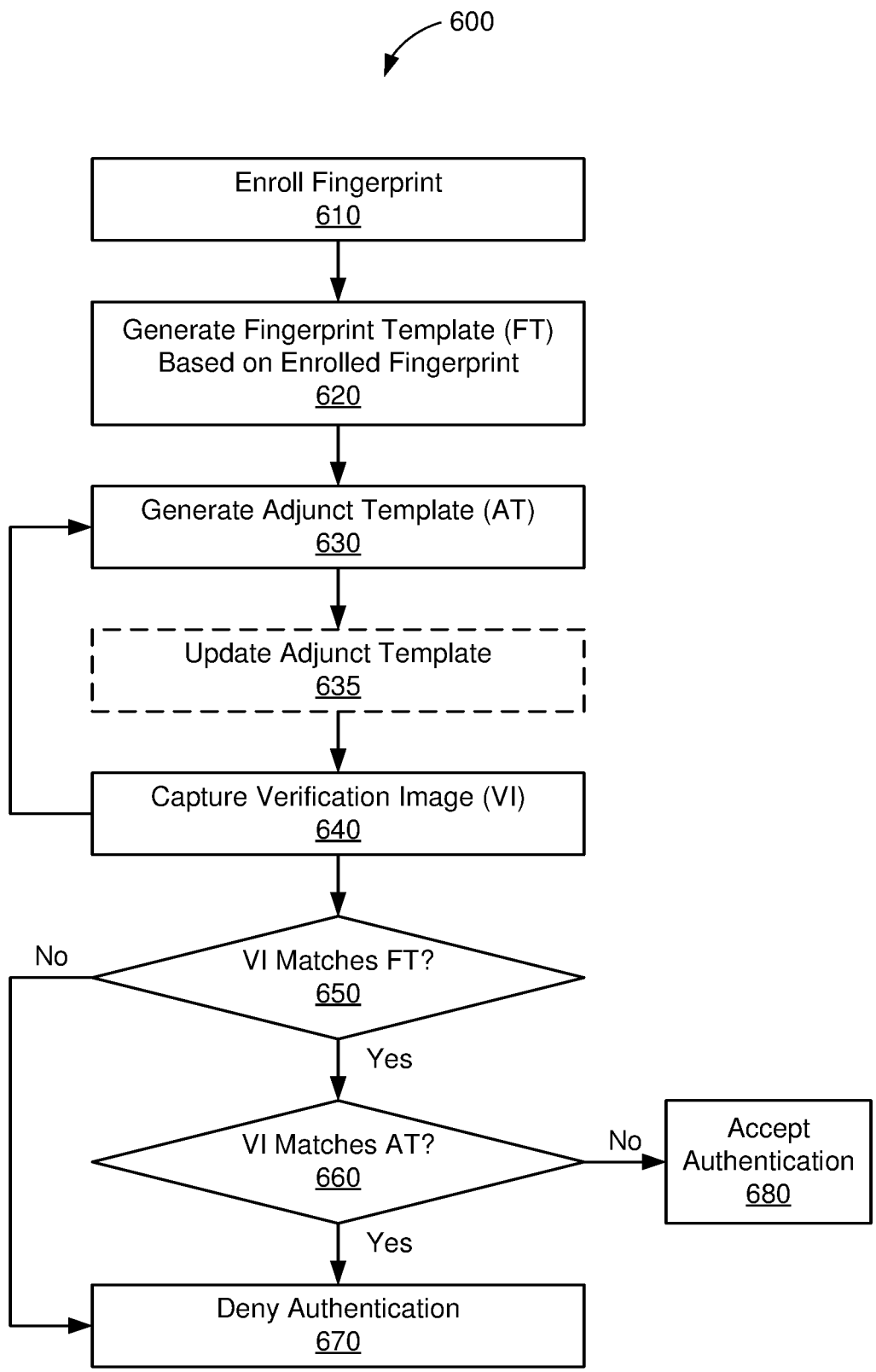
FIG. 6 shows an illustrative flowchart depicting an example fingerprint scanning operation, in accordance with some embodiments.

FIG. 6 shows an illustrative flowchart depicting an example fingerprint scanning operation 600, in accordance with some embodiments. With reference for example to FIG. 2, the operation 600 may be performed by the input device 200 to perform fingerprint authentication while preventing residual fingerprints from interfering with the fingerprint authentication operation. In some embodiments, the fingerprint sensors 214 may implement capacitive fingerprint scanning, ultrasound fingerprint scanning, or any other suitable imaging techniques. In other embodiments, the fingerprint sensors 214 may implement optical fingerprint scanning or imaging techniques. In other implementations, the operation 600 may be performed by system 400 of FIG. 4, or any other feasible system or device.

A user may first enroll his/her fingerprint with the input device 200 (610). For example, the fingerprint enrollment sub-module 222 may enroll one or more fingerprints of an authorized user (e.g., during an initial set-up or enrollment process) to be used for subsequent fingerprint authentication. During the enrollment process, the fingerprint enrollment sub-module 222 may capture one or more images of the user's finger, in various positions and/or orientations, while pressed against an input surface (e.g., coinciding with the sensing region 210) of the input device 200.

The input device 200 may generate a fingerprint template based on the enrolled fingerprint (620). In some embodiments, the fingerprint enrollment sub-module 222 may analyze identifying features of the user's fingerprints from the captured images, and may generate a fingerprint template 232 for the user (e.g., which may include the captured images) based on the analysis. For example, the identifying features may include a pattern of ridges on the surface of the user's finger.

The input device 200 may further generate an adjunct template based on the enrolled finger (630). For example, the template update sub-module 224 may be configured to acquire updated information from the fingerprint sensors 214 to supplement the information stored in the fingerprint template repository 230. More specifically, the template update sub-module 224 may record the presence of any residual fingerprints on the input surface which may interfere with a subsequent fingerprint authentication operation. Thus, when a fingerprint is first enrolled (e.g., prior to performing any fingerprint authentication operations), the template update sub-module 224 may use the fingerprint template 232 (or information therein) to generate the adjunct template 234. In some aspects, the template update sub-module 224 may analyze a position and/or orientation of one or more fingerprints captured during the enrollment process, and may generate the adjunct template 234 based on the analysis. In other embodiments, the template update sub-module 224 may analyze a position and/or orientation of one or more fingerprints, or a number n fingerprints, captured during a period of time during the enrollment process. For example, the template update sub-module 224 may use the n most recent fingerprints.

In some embodiments, the input device 200 may update the adjunct template to reflect a more recent state of the input surface (635). For example, the template update sub-module 224 may attempt to capture any and all residual fingerprints that may have accumulated on the input surface prior to a subsequent fingerprint authentication operation, but are not yet reflected in the adjunct template. Thus, the template update sub-module 224 may operate the fingerprint sensors 214 to capture update images of the sensing region 210 (or at least a portion thereof) independent of any fingerprint enrollment or authentication operation. In some embodiments, the template update sub-module 224 may analyze a position and/or orientation of one or more fingerprints detected in the update images, and may update the adjunct template 234 (e.g., which may include the update images) based on the analysis. In some aspects, the template update sub-module 224 may store each update image in the adjunct template 234. In other aspects, the template update sub-module 224 may store only the most recent update image in the adjunct template 234 (e.g., replacing any previously-stored images).

In some embodiments, the template update sub-module 224 may acquire the update images periodically (e.g., every 5 minutes) and/or at predetermined times. In some other embodiments, the template update-sub-module 224 may acquire the update images when a transition event has occurred. For example, a transition event may indicate that the electronic system has not been used or operated by the authorized user for some time and/or is likely to require fingerprint authentication upon subsequent use. Example transition events may include, but are not limited to: powering down the display and/or locking the electronic system; the electronic system remaining idle and/or still for a threshold amount of time; detecting a user's finger in contact with or proximate to (e.g., hovering over) the sensing region 210; detecting a change in position and/or orientation of the electronic system via an accelerometer; detecting a change in light from an ambient light sensor; and/or detecting that a button been depressed.

The input device 200 then captures a verification image (640). For example, the fingerprint verification sub-module 226 may trigger the fingerprint sensors 214 to capture a verification image when an authentication event is triggered (e.g., when a finger or input object makes contact with a portion of the sensing region 210 coinciding with the fingerprint sensors 214). For example, the verification image may correspond to an image of the sensing region 210 (or at least a portion thereof) including the input object (e.g., user's finger) that triggered the authentication operation. In some embodiments, the fingerprint verification sub-module 226 may analyze the verification image to determine whether the verification image includes a valid fingerprint belonging to an authorized user of the input device 200. In some aspects, the fingerprint verification sub-module 226 may use the information stored in the fingerprint repository 230 to determine whether to authenticate the user associated with the verification image.

In some embodiments, the input device 200 may generate a new adjunct template based on the recently-acquired verification image (630). As described above, the template update sub-module 224 may record the presence of any residual fingerprints on the input surface which may interfere with a subsequent fingerprint authentication operation. Thus, once a verification image has been captured by the fingerprint sensors 214 (e.g., during a fingerprint authentication operation), the template update sub-module 224 may acquire the updated information from the captured verification image. In some aspects, the template update sub-module 224 may analyze a position and/or orientation of one or more fingerprints detected in the verification image, and may generate the new adjunct template 234 based on the analysis. The new adjunct image may replace the old or previous adjunct image stored in the fingerprint template repository.

During the authentication process, the input device 200 may first determine whether the verification image matches the fingerprint template (650). For example, the fingerprint verification sub-module 226 may compare the verification image to the fingerprint template 232 to determine whether the verification image includes a verified fingerprint. In some aspects, the fingerprint verification sub-module 226 may detect the presence of a verified fingerprint if the fingerprint information and/or enrollment images included with the fingerprint template 232 matches fingerprint information from the verification image (e.g., regardless of position or orientation). In some implementations, the fingerprint verification sub-module 226 may use existing or known fingerprint matching techniques to determine a measure of similarity between the verification image and the fingerprint template 232.

If no match is detected between the verification image and the fingerprint template (as tested at 650), the input device 200 may deny authentication to the requesting user (670). For example, if a verified fingerprint cannot be detected from the verification image (e.g., the similarity measure is below a threshold level), the fingerprint verification sub-module 226 may prevent the user from accessing or operating the corresponding electronic system. However, if a match is detected between the verification image and the fingerprint template (as tested at 650), the input device 200 may then determine whether the verification image matches the adjunct template (660). For example, residual fingerprints left over by an authorized user may spoof some fingerprint scanners into authenticating an unauthorized user. Thus, in some embodiments, the fingerprint verification sub-module 226 may further compare the verification image to the adjunct template 234 to determine whether the verified fingerprint is attributed to the physical presentation of an actual user's finger or a residual fingerprint. In some embodiments, the operation of FIG. 6 may occur in a different order. For example, the input device 200 may first determine whether the verification image matches the adjunct template (660), and then, if a match is not detected, the input device may determine whether the verification image matches the fingerprint template (as tested at 650).

In some implementations, the fingerprint verification sub-module 226 may use existing or known fingerprint matching techniques to determine a measure of similarity between the verification image and the adjunct template 234. In some embodiments, the fingerprint verification sub-module 226 may compare the verification image to each image included with the adjunct template 234 (e.g., including the previous verification image and each update image acquired since) and/or fingerprint information associated therewith. In some other embodiments, the fingerprint verification sub-module 226 may compare the verification image to only the most recently-acquired image in the adjunct template 234 (e.g., which may also be the only image included in the adjunct template 234) and/or fingerprint information associated therewith.

If a match is detected between the verification image and the adjunct template (as tested at 660), the input device 200 may deny authentication to the requesting user (670). In some embodiments, the fingerprint verification sub-module 226 may authenticate the user if and only if the verified fingerprint is substantially different than each of the images included in the adjunct template 234. Thus, if at least one of the images in the adjunct template shares a threshold amount of similarity with the verified fingerprint, the fingerprint verification sub-module 226 may prevent the user from accessing or operating the corresponding electronic system. In other embodiments, the fingerprint verification sub-module 226 may authenticate the user if the verified fingerprint is substantially different than the most recent image included in the adjunct template 234. Thus, if the most recent image shares a threshold amount of similarity with the verified fingerprint, the fingerprint verification sub-module 226 may prevent the user from accessing or operating the corresponding electronic system.

If no match is detected between the verification image and the adjunct template (as tested at 660), the input device 200 may then authenticate the requesting user (680). In some embodiments, the fingerprint verification sub-module 226 may authenticate the user if and only if the verified fingerprint is substantially different than each of the images included in the adjunct template 234. In other embodiments, the fingerprint verification sub-module 226 may authenticate the user if the verified fingerprint is substantially different than the most recent image included in the adjunct template 234.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. An input device comprising:
   a biometric sensor configured to capture images of a sensing region of the input device;
   processing circuitry; and
   a memory storing instructions that, when executed by the processing circuitry, cause the input device to:
   acquire a first image of the sensing region from the biometric sensor in response to a first authentication trigger;
   acquire a second image of the sensing region from the biometric sensor in response to a second authentication trigger;
   determine whether an amount of similarity between the first image and the second image exceeds a threshold similarity level, the first image being different than the second image when the amount of similarity is below the threshold similarity level; and
   prevent the second image from being used for user authentication responsive to determining that the amount of similarity between the first image and the second image exceeds the threshold similarity level.

2. The input device of claim 1, wherein execution of the instructions further causes the input device to:
   acquire a third image of the sensing region, wherein the third image is acquired subsequent to the first image and prior to the second image; and
   determine whether an amount of similarity between the third image and the second image exceeds the threshold similarity level, wherein prevention of the second image from being used for user authentication further comprises:
    determining that the amount of similarity between the third image and the second image exceeds the threshold similarity level.

3. The input device of claim 2, wherein the third image of the sensing region is acquired periodically, or at predetermined times, or a combination thereof.

4. The input device of claim 2, wherein the third image of the sensing region is acquired when an input object is detected in contact with or proximate to the sensing region.

5. The input device of claim 2, wherein the third image of the sensing region is acquired based at least in part on an accelerometer, an ambient light sensor, a button press, or a combination thereof.

6. The input device of claim 1, wherein the amount of similarity is based at least in part on a change in position between the first image and the second image, or a change in orientation between the first image and the second image, or a combination thereof.

7. The input device of claim 1, wherein at least the second authentication trigger comprises:
    a detection of an input object in contact with at least a portion of the sensing region.

8. The input device of claim 1, wherein execution of the instructions further causes the input device to:
    acquire an enrollment image during an enrollment process prior to the acquisition of the first and second images; and
    authenticate the second image when the second image matches the enrollment image.

9. A method performed by one or more processors of an input device, comprising:
    acquiring a first image of a sensing region from a biometric sensor in response to a first authentication trigger;
    acquiring a second image of the sensing region from the biometric sensor in response to a second authentication trigger;
    determining whether an amount of similarity between the first image and the second image exceeds a threshold similarity level, the first image being different than the second image when the amount of similarity is below the threshold similarity level; and
    preventing the second image from being used for user authentication responsive to determining that the amount of similarity between the first image and the second image exceeds the threshold similarity level.

10. The method of claim 9, further comprising:
    acquiring a third image of the sensing region, wherein the third image is acquired subsequent to the first image and prior to the second image; and
    determining whether an amount of similarity between the third image and the second image exceeds the threshold similarity level, wherein preventing the second image from being used for user authentication further comprises:
        determining that the amount of similarity between the third image and the second image exceeds the threshold similarity level.

11. The method of claim 10, wherein the third image of the sensing region is acquired periodically, or at predetermined times, or a combination thereof.

12. The method of claim 10, wherein the third image of the sensing region is acquired when a display coupled to the input device is powered down.

13. The method of claim 12, wherein the amount of similarity is based at least in part on a change in position between the first image and the second image, or a change in orientation between the first image and the second image, or a combination thereof.

14. The method of claim 9, further comprising:
    acquiring an enrollment image during an enrollment process prior to the acquisition of the first and second images; and
    authenticating the second image when the second image matches the enrollment image.

15. A system, comprising:
    a biometric sensor configured to capture images of a sensing region;
    one or more processors; and
    a non-transitory computer-readable medium storing instructions that, when executed by the one or more processors, cause the system to:
        acquire a first image of the sensing region from the biometric sensor in response to a first authentication trigger;
        acquire a second image of the sensing region from the biometric sensor in response to a second authentication trigger;
        determine whether an amount of similarity between the first image and the second image exceeds a threshold similarity level, the first image being different than the second image when the amount of similarity is below the threshold level; and
        prevent the second image from being used for user authentication responsive to determining that the amount of similarity between the first image and the second image exceeds the threshold similarity level.

16. The system of claim 15, wherein execution of the instructions causes the system to:
    acquire a third image of the sensing region, wherein the third image is acquired subsequent to the first image and prior to the second image; and
    determine whether an amount of similarity between the third image and the second image exceeds the threshold similarity level, wherein prevention of the second image from being used for user authentication further comprises:
        determining that the amount of similarity between the third image and the second image exceeds the threshold similarity level.

17. The system of claim 16, wherein the third image of the sensing region is acquired when the system is locked, or idle for a threshold amount of time, or a combination thereof.

18. The system of claim 16, wherein the third image of the sensing region is acquired when an input object is detected in contact with or proximate to the sensing region.

19. The system of claim 16, further comprising:
    a display coupled to the processor, wherein the third image of the sensing region is acquired when the display is powered down.

20. The system of claim 15, wherein the amount of similarity is based at least in part on a change in position between the first image and the second image, or a change in orientation between the first image and the second image, or a combination thereof.

\* \* \* \* \*